United States Patent Office 3,054,725
Patented Sept. 18, 1962

3,054,725
11-HYDROXYLATION OF STEROIDS BY PHOMA MICROORGANISMS
Jan Ilavsky, Pompton Plains, and Hershel Herzog, Mountain View, N.J., assignors to Schering Corporation, Bloomfield, N.J., a corporation of New Jersey
No Drawing. Filed Nov. 17, 1958, Ser. No. 774,119
40 Claims. (Cl. 195—51)

The present invention relates to the microbiological treatment of steroids to effect a selective chemical modification thereof. More particularly, this invention relates to the effective and substantial microbiological transformation of 11-desoxy steroids to form the corresponding 11-hydroxy derivatives, and particularly the 11β-hydroxylated derivatives thereof.

Heretofore it has been known to introduce oxygen into the 11-position of a steroid nucleus. Among the processes suggested for accomplishing this oxidation, the biochemical have been of particular interest, since it has made possible the direct introduction of oxygen at this point, avoiding the plurality of steps inherent in the highly involved organic syntheses, otherwise necessary. Bio-oxidation is accomplished by subjecting a steroid containing an 11-methylene group to the action of oxygenating enzymes produced by various microorganisms. Such bio-oxidative techniques have hitherto presented certain difficulties. Thus, the yield of product, such as 11-epi-hydrocortisone, expressed as a proportion of the starting material such as 4 - pregnene - 17α,21 - diol - 3,20 - dione (Reichstein's Substance S), may be significantly small. Also certain of the known hydroxylating microorganisms are so difficultly developed and sustained as to seriously limit their commercial feasibility.

Accordingly, the present invention provides a novel and expeditious procedure for the production of 11-hydroxylated steroids, which comprises subjecting 11-desoxy steroids to the oxidative action of an easily developed and sustained hydroxylating fungus of the class *Fungi imperfecti*, order Sphaeropsidales, family Sphaerioidaceae, and genus Phoma such as isolates of our culture collection sp. Sch. M–774, sp. Sch. M–775, sp. Sch. M–778, sp. Sch. M–912, sp. Sch. M–934, sp. Sch. M–984, sp. Sch. M–985 and particularly, and indeed most desirably, those isolates of Sch. M–536 (American Type Culture Collection, Washington, D.C. (ATCC 13145)), or oxidizing enzymes thereof, to cause the production in high yield (e.g. in excess of 50% and normally in the range of 80% by weight and higher of steroid substrate of the corresponding 11-hydroxylated derivatives. Normally, of this yield about 70% to 80% by weight is 11α-hydroxylated product and approximately 20% to 30% is 11β-hydroxylated steroid. These products can be separated from one another by well-known procedures, e.g. chromatographic analysis and elution from a column employing aluminum oxide, magnesium silicate or the like followed by crystallization or similar procedure as described hereinbelow. The quantity of steroid substrate per liter of total fermentation mix is normally in the range of about 100 mg. per liter to 2 g. per liter, and preferably from about 500 mg. per liter to 1 g. per liter.

These fungal organisms including their mutants are stable and easily grown and are obtainable from natural sources using techniques known to microbiologists.

Representative of the 11-desoxy steroids for use in the practice of our invention are:

4-pregnene-17α,21-diol-3,20-dione (11 - desoxy - 17α - hydroxy-cortisone, Reichstein's Substance S),
1,4-pregnadiene - 17α,21-diol-3,20-dione (1-dehydro-11-desoxy-17α-hydroxy-cortisone),
16α-methylallopregnane-17α,21-diol-3,20-dione,
16β-methylallopregnane-17α,21-diol-3,20-dione,
16α-t-butylallopregnane-17α,21-diol-3,20-dione,
16β-ethylallopregnane-17α,21-diol-3,20-dione,
16β-methyl-4-pregnene-17α,21-diol-3,20-dione,
16α-methyl-1,4-pregnadiene-17α,21-diol-3,20-dione,
16β-methyl-1,4-pregnadiene-17α,21-diol-3,20-dione,
16α-t-butyl-1,4-pregnadiene-17α,21-diol-3,20-dione,
16β-ethyl-1,4-pregnadiene-17α,21-diol-3,20-dione,
pregnane-17α,21-diol-3,20-dione,
allopregnane-17α,21-diol-3,20-dione,
pregnane-17α,21-diol-3,20-dione,
16α-methyl-4-pregnene-17α,21-diol-3,20-dione,
1,4,6-pregnatriene-17α,21-diol-3,20-dione, as well as the 21-acyl (e.g. acetate, propionate) derivatives and particularly the acyl derivatives of the lower alkanoic acids thereof. It will be apparent that the 11-desoxy steroids which can be hydroxylated at the 11-carbon atom of the steroid nucleus by the process herein described are not narrowly delimited, but encompass those 11-desoxy compounds having a cyclopentanoperhydrophenanthrene nucleus e.g. 11-desoxy sterols, bile acids, cardiac aglycones, saponins, sex hormones, D-vitamins, androstanes and preferably the 11-desoxy androstenes, such as the 4-androstenes, 1,4-androstadines e.g. 4-androstene-3,17-dione, 1,4-androstadiene-3,17-dione, testosterone and the like and most particularly those 11-desoxy steroids wherein the A-ring contains preferably a 3-keto configuration and a pregnane side chain containing 2 carbon atoms attached to the D-ring at C–17 and preferably an oxygen atom or oxygen function (e.g. O, OH) at C–20. In addition, it is often desirable that at least one double bond be present (e.g. at Δ⁴·⁵ in the A-ring).

In general, however, the more preferred compounds for use in the practice of our invention are the 11-desoxy pregnanes, allopregnanes, and unsaturated analogues thereof (including within the term "pregnanes" and "allopregnanes" as employed herein, and unless otherwise explicitly indicated, the substituted derivatives thereof as well), and particularly those compounds represented by the structure:

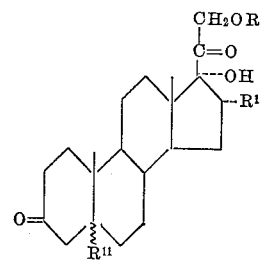

wherein R is hydrogen or an acyl radical derived preferably, from a lower alkanoic acid; and $R^1$ is hydrogen or a lower alkyl radical; $R^{11}$ is hydrogen or allo-hydrogen, and $R^{11}$ is preferably allo-hydrogen when $R^1$ is alkyl, and the 1-pregnene, 4-pregnene, 1,4-pregnadiene and 1,4,6-pregnatriene analogues thereof.

The product in each instance is the corresponding 11-hydroxy compound, which is formed in high and in some instances quantitative yield. In particular, Reichstein's Substance S, and its 16α-methyl-derivative are converted to 4-pregnene-11α (and 11β), 17α,21-triol-3,20-dione, and 16α-methyl-4-pregnene-11α (and 11β), 17α,21-triol-3,20-dione respectively in yields normally in excess of 70%. It should be noted that when certain of the substrate containing acyloxy substituents at positions such as C–21 and described herein are subjected to 11-hydroxylation with an oxygenating member of the genus Phoma, hydrolyses of these acyloxy groups of the corresponding alcohol may be frequently seen to occur.

Examples of other less preferred compounds which can be hydroxylated in the 11-position by the process of the present invention include 16β-methyl-5-pregnene-3β,17α-diol-20-one, 3β,21-diacetoxy - 16α - methyl-5-pregnene-3β,17α-diol-20-one and 16β-methyl-5-pregnene-3β,17α-diol-20-one, the preparation of which is described hereinafter, as well as the corresponding 16-ethyl, 16-tert.-butyl and like homologues thereof.

The 11-desoxy and 11-oxygenated steroids disclosed herein containing alkyl substituents in the C–16 positions together with processes for their production are the invention of Eugene P. Oliveto and Richard Rausser and are not claimed in the present application apart from our invention which is limited to a novel process wherein 11-desoxy steroids are transformed by a fungus of the genus Phoma to the corresponding 11-hydroxylated derivatives.

A variety of procedures can be employed to prepare the 16-alkyl steroids. Illustratively, 16α or 16β-alkyl-11-desoxyallopregnanes can be prepared from 16α-alkyl or 16β-alkyl pregnenolones, such as for example, 16α-methyl-pregnenolone, 16β-tert.-butylallopregnenolone and the like by initially hydrogenating the 16-alkyl-pregnenolone over such conventional catalytic agents as palladium on charcoal to cause the formation of a solid precipitate, the 16α- or 16β-alkylallopregnane-3β-ol-20-one, e.g. 16α- or 16β-methylallopregnane-3β-ol-20-one. In order to introduce an hydroxyl group at C–17, the C–20-keto group of this latter compound is converted to the enol-acetate by refluxing said 16-alkylallopregnane-3β-ol-20-one with acetic anhydride and a strong acid, such as p-toluenesulfonic acid or perchloric acid, for example. It is preferred not to isolate the enol-acetate but rather to react said substance in situ with a peroxy-acid, such as for example, peracetic acid, perbenzoic acid, monoperphthalic acid, or pertrifluoroacetic acid, whereby a second intermediate, a 17,20-epoxide, preferably not isolated, is obtained. Treatment of the reaction mixture with alkali hydrolyzes the epoxide in situ to cause the production of the crude, solid, 17α-hydroxylated product which can be separated out suitably by filtration and subsequent crystallization from a medium such as methanol-water. The crystalline product is 16-alkylallopregnane-3α,17β-diol-20-one. Acyloxylation, e.g. acetoxylation, of the C–21 methyl group is effected in the conventional manner as noted hereinabove, such as by bromination of the C–21 methyl group, followed by reaction of the bromo-derivative with, for example, sodium or potassium acetate, whereby 16α-alkylallopregnane - 3β,17α,21 - triol-20-one 21-acetate is formed.

The product so obtained is oxidized sequentially at the 3–C position by known standard procedures such as for example with N-bromoacetamide, N-bromosuccinimide or chromic acid to yield upon subsequent crystallization from acetone-hexane, 16-alkylallopregnane-17α,21-diol-3,20-dione 21-acetate. This latter compound can be saponified so as to produce the corresponding C–21 alcohol, 16 - alkylallopregnane - 17α,21-diol-3,20-dione, by reaction with hydrolytic agents such as aqueous methanolic potassium bicarbonate or with such reagents as sodium carbonate, sodium hydroxide, sodium alkoxides (e.g. sodium methoxide, sodium ethoxide) and acids such as p-toluenesulfonic acid.

Microorganisms such for example *Flavobacterium dehydrogenans* var. *hydrolyticum* can also be employed for this purpose using standard procedures such as that disclosed in Union of South Africa Patent 3,462/55 and described in detail hereinafter. The crude product thus formed is desirably separated out by filtration and crystallized from acetone-hexane. The hydroxyl group is then, if desired, introduced into the 11-position of said 16-alkylallopregnane-17α,21-diol-3,20-dione by the process of our invention employing a microorganism of the genus Phoma.

The resultant products are valuable intermediates in the formation of the corresponding 11β-hydroxy-1,4-dienes and 11-keto-1,4-dienes which are valuable therapeutically active anti-inflammatory compounds useful in the treatment of diseases such as arthritis. To effect the production of the 11α-hydroxy and 11β-hydroxy-1,4-dienes from the corresponding 11α-hydroxy and 11β-hydroxy 16-alkylallopregnanes, respectively the 16α-alkylallopregnane-11α and/or 11β,17α,21-triol-3,20-dione is initially reacted with chromium trioxide in pyridine to cause the oxidation of the 11-hydroxy to the 11-keto derivative, 16α-alkylallopregnane-17α,21-diol-3,11,20-trione. It is thus evident that the 11α-hydroxyl and 11β-hydroxyl steroids obtained by the process of the present invention can be reacted conveniently in a mixture as well as separately to form the corresponding 11-keto steroid. This compound is then converted to the corresponding 1,4-diene by dihalogenation, preferably dibromination which occurs at the 2-carbon and 4-carbon linkage of the A-ring. Didehydrobromination is then effected with a basic agent, preferably dimethylformamide, to produce the desired 1,4-diene, 16α-alkyl - 1,4 - pregnadiene - 17α,21-diol-3,11,20-trione.

Alternatively, the 16 - alkylallopregnane-17α,21-diol-3,20-dione 21-acylate can be dehydrogenated initially in the A-ring in order to effect the preparation of the corresponding 11-desoxy-1,4-diene by the procedure described immediately above whereby the 16-alkylallopregnane-17α,21-diol-3,20-dione 21-acetate is dihalogenated preferably with bromine, to form the intermediate 2,4-dibromo-16-alkylallopregnane-17α,21-diol-3,20-dione 21-acetate. Didehydrobromination with basic agents, preferably dimethylformamide, produces the 21-acetate of 16-alkyl-1,4-pregnadiene-17α,21-diol-3,20-dione, which can then be saponified so as to produce the corresponding C–21-alcohol, 16-alkyl-1,4-pegnadiene-17α,21-diol-3,20-dione, by employment of standard hydrolytic agents such as those described above. The hydroxyl group is then introduced into the 11-position thereof by the process of our invention as described in detail hereinafter by employing a microorganism of the genus Phoma, and preferably Phoma (ATCC 13145). The resultant 16-alkyl-1,4-pregnadiene-11α, and 11β,17α,21-triol-3,20-dione can, of course, be separated from each other by column chromatography as described hereinafter and/or can be again esterified at the C–21-position if desired by standard acyl oxylation, e.g. alkanoyloxylation, such as that noted hereinabove, e.g. reaction with acetyl chloride and pyridine and sequentially oxidation with chromic acid to the corresponding 11-keto derivative, 16-alkyl-1,4-pregnadiene-17α,21-triol-3,11,20-trione which is a valuable therapeutic agent in the treatment of anti-inflammatory diseases, such as arthritis.

Further, 16β-alkyl-17α-hydroxy-4-pregnenes for use in the process of our invention can be prepared in the following manner wherein a 16-alkyl-5,16-pregnadiene-3β-ol-20-one is employed as the starting material. This compound is initially epoxidized at the 16(17)-linkage of the D-ring, with hydrogen peroxide. The 3–C hydroxyl group of this epoxy compound is then acetylated with acetic anhydride in a basic reaction medium, e.g. pyridine, to yield 3β - acetoxy - 16β - methyl - 16α,17α-epoxy-5-pregnene-20-one. Although acetylation is shown and is indeed the preferred procedure, other acylations such as for example with propionic anhydride to cause the formation of the corresponding 3β-propionoxy derivative can also be performed.

The 3β-alkanoyloxy compound thus produced is then reacted with glacial acetic acid and a hydrogen halide, e.g. hydrogen chloride, hydrogen bromide, to effect the preparation of the alkylene derivative, for example, the 16-methylene compound, 3β-acetoxy-16-methylene-5-pregnene-17α-ol-20-one, which is hydrogenated by standard procedure using, for example, palladium on charcoal, to form the corresponding 16-alkyl derivative, e.g. 3β-acetoxy-16β-methyl-5-pregnene-17α-ol-20-one. This compound can then be acyloxylated in the C–21 position of the D-ring by halogenation, preferably bromination, of the C–21 methyl group, followed by reaction of the bromo-derivative thus produced with sodium or potassium acetate, butyrate or the like, in the usual manner, to give the 3β,21 - dialkanoyloxy-16β-alkyl-5-pregnene-17α-ol-20-one. This compound when treated with a hydrolytic agent, e.g. sodium bicarbonate, sodium hydroxide, toluenesulfonic acid, followed by oxidation of the 3-hydroxyl group, as by chromic acid, in acetone, and rearrangement of the 5,6-double bond to 4,5 by the action of acid or when treated with a microorganism such as *Flavobacterium dehydrogenans* var. *hydrolyticum* will yield 16β-alkyl-17α,21-dihydroxy-4-pregnene-3,20-dione. Subsequent exposure to the enzymatic activity of a hydroxylating strain of Phoma in accordance with the practice of our invention will result in the introduction into said 16β-alkyl-17α,21-dihydroxy-4-pregnene-3,20-dione of the 11α-hydroxyl and 11β-hydroxyl groups. The resultant 11α-hydroxy steroid, 16β-alkyl-11α,17α,21-trihydroxy-4-pregnene-3,20-dione is convertible to the corresponding 11β-hydroxy-4-monoene and the 11-keto 4-monoene which compounds are therapeutically useful in the treatment of inflammatory diseases, such as for example, arthritis, or can be converted to the corresponding 1,4-dienes, 16β-alkyl - 11β,17α,21-trihydroxy-1,4-pregnadiene-3,20-diones and 16β-alkyl-17α,21-dihydroxy-1,4-pregnadiene-3,11,20-triones by reaction with *Corynebacterium simplex* according to procedures described in United States Patent 2,837,464; which compounds are also therapeutically active anti-inflammatory agents useful in the treatment of arthritis and like diseases.

Similarly, 16α-alkyl-17α-hydroxy-4-pregnenes can be prepared from 16α-alkyl-pregnenolone-3-acetate (e.g. 16α-methyl-5-pregnene-3β-ol-20-one 3-acetate as well as the corresponding propionate, butyrate or the like), by sequentially halogenating e.g. chlorinating this latter compound in the 5–C and 6–C positions, in a basic medium such as pyridine, lutidine or the like; introducing the hydroxy group into the 17–C position by the method described above, that is by enolacetylation of the 20–C keto group with acetic anhydride and p-toluenesulfonic acid or the like and sequential reaction of this 20-enol-acetate, preferably in situ, with an acid such as peracetic acid or perchloric acid to form the corresponding 17,20-epoxide. This compound too is treated in situ with alkali, e.g. potassium bicarbonate, and hydrolyzed thereby to yield the 16α - alkyl - 5,6-dichloropregnane-3,17α-diol-20-one 3-acetate. Acyloxylation of the C–21 position is then effected in the standard manner by bromination of the C–21 methyl group and subsequent reaction thereof with sodium or potassium acetate or the like. The resulting compound, 16α - alkyl - 5,6-dichloro-pregnane-3β,17α,21-triol-20-one 21-acetate, is then oxidized at the C–3 position of the A-ring and hydrolyzed at C–21 by means of a microorganism, e.g. *Flavobacterium dehydrogenans* var. *hydrolyticum* as noted above, to yield 16α-alkyl-5,6-dichloro-pregnane-17α,21-diol-3,20-dione. This latter compound is readily dehalogenated employing well-known procedures e.g. zinc dust in an acid medium such as acetic acid, which results in the formation of a double bond at the 4(5)-carbon linkage, the product being 16α-alkyl-4-pregnene-17α,21-diol-3,20-dione 21-acetate.

Alternatively, 16α-alkyl-4-pregnene-17α,21 - diol - 3,20-dione is prepared from 16α-alkyl-5,6-dichloropregnane-3,17α,21-triol 21-acetate, preferably, by reaction thereof with nascent chromous chloride to form 16α-alkyl-5-pregnene-3β,17α,21-triol-20-one 21-acetate which is transformed to the corresponding 4-pregnene with *Flavobacterium dehydrogenans* var. *hydrolyticum* or alternatively with standard chromium trioxide reagent to form the 16α-alkyl-5-pregnene-17α,21-diol-3,20-dione which undergoes intramolecular rearrangement when treated with a methanolic solution of sodium bicarbonate or the like, to produce the desired 16α-alkyl-4-pregnene-17α,21-diol-3,20-dione.

This compound however prepared, when subjected to the enzymatic activity of Phoma (ATCC 13145), for example, according to the process of our invention as described herein, results in the 11-hydroxylation thereof to produce 16α-alkyl-4-pregnene-11β,17α,21-triol-3,20-dione, a valuable agent in the treatment of inflammatory diseases such as arthritis and 16α-alkyl-4-pregnene-11α,17α,21-triol-3,20-dione, which compounds can be separated out of the reaction mixture by column chromatography as described hereinafter together with crystallization or the like and the 11α-derivative converted by known procedures to the corresponding 11β-hydroxyl compound, if so desired. These 11-hydroxylated products can also be converted without separation from the reaction mix to their 11-keto-derivative, or converted to form the corresponding 11β-hydroxyl-1,4-diene or 11-keto-1,4-diene compounds, which 11-keto- or 11β-hydroxyl 4-pregnenes or 1,4-pregnadienes are valuable anti-inflammatory agents particularly useful in the treatment of arthritis, as noted above.

The hydroxylation process of our invention is conveniently accomplished by cultivating the microorganism, for example the preferred Phoma (ATCC 13145) under areobic conditions, on a suitable medium such as described hereinafter, in intimate admixture with the 11-desoxy steroid, such as Substance S, the cultivation or growth of the fungus being continued until the desired enzymatic hydroxylation is effected. Alternatively, and indeed preferably, the process of the present invention is effected by growing a microorganism in a suitable fermentation medium under aerobic conditions, and then separating the cells of the microorganism so cultivated therefrom. The 11-desoxy steroid, such as for example the Substance S referred to hereinabove, which is to be hydroxylated, is then added to these cells under aerobic conditions, for a period of time sufficient to effect the desired oxygenation. This latter procedure results in a marked simplification of the recovery step, but while the latter method is deemed the most desirable the order of addition is not critical. Thus the 11-desoxy steroid can for example also be added to the growth medium which is then inoculated with the fungus.

The eleven desoxy steroid starting material is introduced into the nutrient medium by known standard procedures, as for example, by forming a suspension thereof in water, or by preparing a solution or suspension thereof, in a solvent such as methanol, ethanol, acetone, propylene glycol, dimethylformamide, or dimethylacetamide, or other water-miscible organic solvent which is non-toxic to the microorganism. As noted hereinabove concentrations of steroid in the range of 100 mg. to 1 g. per liter of total fermentation mix can be effectively transformed. The steroid substrate may, in addition, be added in a finely divided form such as a solid micronized powder. It is ordinarily preferred that the steroid be present in very finely divided form in order to expose the greatest surface area thereof and thus permit maximum contact with the oxygenating enzyme produced by the microorganism and the most efficient conversion of eleven desoxy steroid to its eleven hydroxylated derivative. Optionally, the steroid can be added at one time or introduced in a continuous or intermittent manner over a period of time.

Suitable nutrient media for the cultivation of hydroxylating organisms of the genus Phoma include assimilable carbon, organic and inorganic sources of nitrogen together with minor amounts of inorganic salts and trace elements. The concentration of these constituents can be varied within wide limits. Standard sources of carbon appropriate for use in these growth media are carbohydrates such as dextrose, glucose, starch, inverted molasses and the like. Organic nitrogen sources normally employed are such substantially proteinaceous materials as corn steep liquor, lactalbumin digest, yeast extract, or soybean meal containing from approximately ten percent to fifty percent protein. Sources of inorganic bound nitrogen are represented by ammonium nitrate, dibasic ammonium phosphate and the like. Trace elements are supplied by the inclusion in the culture medium of tap water. Inorganic salts (e.g. suitable water-soluble salts of magnesium, zinc, potassium, sodium, phosphorous, iron, and the like) and other such materials, for example, nicotinamide, are normally present in the sources of assimilable carbon and organic nitrogen in amounts sufficient to assure optimum growth of the microorganism in the culture broth but can be separately added to the growth media if so desired.

The following are examples of suitable aqueous nutrient media for use in the present invention:

MEDIUM NUMBER 1

| | [1] Percent |
|---|---|
| Yeast extract (Difco) | 1 |
| Dextrose (cerelose) | 1 |
| Tap water | 98 |
| pH | 6.5 |

MEDIUM NUMBER 2

| | | |
|---|---|---|
| Peptone | gm | 5 |
| Soybean oil meal | gm | 5 |
| Yeast extract | gm | 3 |
| Glucose | gm | 20 |
| $KH_2PO_4$ | gm | 5 |
| NaCl | gm | 5 |
| Tap water to one liter. | | |
| pH | | 6.3 |

MEDIUM NUMBER 3

| | Gm. |
|---|---|
| Sodium nitrate | 2 |
| $K_2HPO$ | 1 |
| $MgSO_4 \cdot 7H_2O$ | 0.5 |
| Yeast extract | 1 |
| KCl | 0.5 |
| Glucose | 50.0 |
| Tap water to one liter. | |

[1] Percentages, as referred to throughout this specification and unless otherwise explicitly indicated, are percentages by weight.

The pH of the culture medium is not critical, although it is known that fungi fare better in a slightly acid medium as opposed to an alkaline medium. Thus, a pH of 4 to 8 is thoroughly operative for proper growth of Phoma (ATCC 13145) with a preferred pH being in the range of 5.3 to 7.5. The pH is adjusted to these ranges by addition of a suitable acid or alkaline material, such as, for example, sodium hydroxide or potassium hydroxide or hydrochloric acid. The addition of small quantities of anti-foaming agents, although not essential, is desirable, particularly in commercial scale operation.

To promote the growth of the hydroxylating member of the genus Phoma and the biochemical transformation of the steroid substrate, e.g. Substance S, the culture is preferably shaken and/or aerated and stirred.

Thus the eleven desoxy steroids employed in the present invention can be suitably oxygenated in the following manner:

The culture as received from the culture collection, or vegetative growth of an oxygenating strain of Phoma (ATCC 13145) is grown on an agar medium (e.g. 0.3 percent yeast extract, 1.0 percent cerelose, 0.1 percent corn steep liquor) at a preferred temperature of 22° C. to 28° C., although temperatures as low at 15° C. or as high as 35° C. are not detrimental. After a period of time, about three to ten days pycnidia appear. The growth medium and conidia are then washed with sterile water and after several washings, there remains a heavy suspension which is used for inoculation of the liquid fermentation medium as described above. The conversion from the spore stage to the vegetative mycelium stage generally occurs in 12 to 48 hours and can actually occur in as little as 5 hours. At the end of this growth period, which is measured by the appearance of a thick vegetative mycelium, an inoculum consisting of about one percent vegetative mycelium is added to shake flasks containing the fermentation medium, and the flasks are shaken on a rotary shaker until substantial growth is observed (generally 12 hours to 24 hours). At this point, the eleven desoxy steroid substrate, finely divided or dissolved as described hereinabove is added to the culture medium. The steroid concentration in an alcohol medium (e.g. ethanol, methanol), for example, is normally from 2 to 3 mg. of steroid per gram of solvent by weight thereof. Increased concentrations of steroid in solvent are had by warming the alcohol or substituting another solvent therefor such as dimethylformamide wherein concentrations of up to 100 mg. and more of steroid per gram of dimethylformamide are completely dissolved. The concentration of steroid in the total fermentation mixture is in the range of 100 mg. per liter to 1 g. per liter. The fermentation mixture is normally shaken until complete conversion is effected (e.g. about 6 hours to 96 hours). The conversion of eleven desoxy steroid, such as Substance S to the eleven hydroxylated derivatives, e.g. 4-pregnene-11α,17α,21-triol-3,20-dione and 4-pregnene-11β,17α,21-triol-3,20-dione, is determined in the conventional manner by paper chromatography supplemented by crystallization by standard procedures and as described hereinbelow.

Alternatively, instead of employing a one per cent inoculum of the vegetative mycelium, a spor (conidia) suspension may be used directly. However, such a procedure is less preferred since it requires extended periods of time for proper growth of mycelium and conversion of eleven desoxy steroid.

At the conclusion of the fermentation process, the desired 11-hydroxylated steroid, is recovered from the fermentation medium by the following procedure, which describes in particular a 100 ml. fermentation. This is a general procedure and is operative for fermentation of varying amounts.

The mixture is extracted (e.g. usually three or more times), each extraction employing, by way of illustration, two volumes of organic solvent per volume of fermentation broth. The solvent, which may be a halogenated organic solvent, e.g. chloroform, methylene chloride, an ester, e.g. ethyl acetate, an alcohol, e.g. butanol, an ether, e.g. diethyl ether, dibutyl ether, an aromatic solvent, e.g. toluene, or the like, is then dried over sodium sulfate, or like standard drying agent, such as calcium chloride or magnesium sulfate, and then filtered. The filtrate is evaporated to dryness or to a small volume. This solution is used for characterization of steroid content as described hereinafter.

The foregoing growth and fermentation procedure is generally applicable to a small scale process wherein shake flasks on rotary shakers are employed and may be varied on a larger scale so that the fermentation is carried out in tanks and occurs at a much faster rate. The vegetative mycelium can be added to fresh nutrient at a concentration of from about one percent to ten percent and higher and growth is permitted to occur preferably at about 28° C. for approximately 24 hours. Lower concentrations of mycelium are preferred since better aeration, a factor directly associated with more efficient transformation is effected. In this latter instance a submerged inoculum may be employed, into which air is introduced as the oxygen supply. It is generally known that growth mixtures of this type cause the production of large quantities of foam due to the rapid import of air and defoaming agents are therefore usually employed such as, for example, one percent octadecanol or hexadecanol in lard oil, a silicone such as G.E. 60 Anti-Foam (a product of the General Electric Company, Schenectady, New York), a substituted oxazoline which is a non-volatile, amine-type, cationic surface active agent available under the trade name Alkaterge C, or the like. In this latter procedure, when the growth period is substantially complete, the steroid substrate, e.g. Substance S, in alcohol, can be added so that its concentration is up to 2 g. of substrate per liter of broth. The fermentation is then allowed to proceed until completion is evidenced by the disappearance of steroid substrate as determined by chromatographic analysis. At the completion of the conversion, the broth is filtered and extracted with a water-immiscible solvent in which the oxygenated steroid reaction products are soluble. Suitable solvents for this purpose are, for example, halogenated hydrocarbons, e.g. methylene chloride, acetylene tetrachloride; organic acid esters, e.g. tertiary butyl acetate; aromatic hydrocarbons, e.g. benzene, toluene; ketones, diethyl ketone; cyclic amine, e.g. 2-methyl-4-ethyl pyridine. The preferred solvents are chloroform and ethyl acetate. The solvent solution containing the product steroids is then evaporated to yield the crude extract. This crude extract is chromatographed according to well-known standard procedures which involve chromatography thereof over Florisil (magnesium silicate), the ratio by weight of steroid to magnesium silicate being preferably in the range of 1:200 and up to 1:500 and higher. The magnesium silicate being prepared with hexane. The steroid mixture is dissolved in methylene chloride for placement in the column, and the column eluted successively with a plurality of fractions, usually about 10 to 20, of methylene chloride, 0.5% methanol in methylene chloride, 1% methanol in methylene chloride, 1.5% methanol in methylene chloride and further increments of methanol in methylene chloride wherein the percentage of methanol is increased sequentially 0.5% in each instance until the column is eluted with 3.0% methanol and where indicated up to 5.0% methanol in methylene chloride. The oils are removed in the methylene chloride fraction. The 11β-hydroxylated product, for example, where the starting material is the corresponding 11-desoxy compound, Substance S, Reichstein's Compound F (4-pregnene-11β,17α,21-triol-3,20-dione) is obtained in the first methanol fractions, while from the intermediate methanol fractions, a mixture of 11α,11β,6β and 15β hydroxylated products, e.g. 4-pregnene-11β,17α,21-triol-3,20-dione and 4-pregnene-11α,17α,21-triol-3,20-dione, 4-pregnene-6β,17α,21-triol-3,20-dione and 4-pregnene-15β,17α,21-triol-3,20-dione is obtained. The 11α and 11β-hydroxylated constituents as well as the 6β and 15β-hydroxylated substances can be isolated from this mixture in small amounts by recycling through the column, if desired. Alternatively, the 11β-hydroxylated steroid 4-pregnene-11β,17α,21-triol-3,20-dione can be separated from the other components by acyloxylation as described hereinbelow. From the latter methanol fractions a single product, the 11α-hydroxylated derivative, e.g. 4-pregnene-11α,17α,21-triol-3,20-dione is recovered. The pure fractions are identified by infra-red comparison with authentic samples. The mixture above referred to is characterized by paper chromatographic comparison with pure standards. The particular paper chromatographic technique employed and that paper chromatography procedure referred to throughout this specification unless otherwise explicitly indicated is that of Bush, Journal of Biochemistry, vol. 50, page 370 (1952), as modified by Shull, "Paper Chromatography of Steroid Fermentation Products," 126th meeting of the American Chemical Society, September 12 to 17, 1954, New York, New York, section 9A, paper No. 24.

The 11β-hydroxylated steroid, e.g. Compound F (4-pregnene-11β,17α,21-triol-3,20-dione) can be separated from other components in the mixture as noted above, by acyloxylation, preferably, acetylation with excess acetic anhydride in pyridine solution in the standard manner. From the resulting crude steroid mixture, 4-pregnene-11β,17α,21-triol-3,20-dione 21-acetate, is separated readily by crystallization from acetone-hexane. The diacetates of the other components of the mixture are formed and these are more soluble in the acetone-hexane solution and are thus retained in the mother liquor. 4-pregnene-11β,17α,21-triol-3,20-dione 21-acetate is identified by infra-red comparison with an authentic sample.

As noted above, the 11α-hydroxy steroids prepared by the process of this invention are readily converted to the corresponding 11-keto and 11β-hydroxy derivatives by known methods. Thus, an illustrative procedure for oxidation of the 11α-hydroxy group to the corresponding 11-keto group is described by Peterson, Eppstein et al., in the Journal of the American Chemical Society, vol. 75, pp. 412–415 (Jan. 20, 1953), wherein, for example, 4-pregnene-11α,17α,21-triol-3,20-dione is converted to 4-pregnene-17α,21-diol-3,11,20-trione. The conversion of 11-keto 4-monoenes to the corresponding 11β-hydroxy-4-monoenes is desirably accomplished by the procedure of Oliveto, Rausser et al., Journal of the American Chemical Society, vol. 78, pp. 1736–1738 (April 20, 1956). Similarly, 11β-hydroxy-1,4-dienes are conveniently prepared from the corresponding 11-keto-1,4-dienes by the procedure of Herzog, Payne et al., Journal of the American Chemical Society, vol. 77, pp. 4781–4784 (September 20, 1955).

The following examples are further illustrative of the invention:

EXAMPLE 1

*4-Pregnene-11α,17α,21-Triol-3,20-dione and 4-Pregnene-11β,17α,21-Triol-3,20-Dione*

Agar slants containing medium No. 1 described above and 1.5% by weight of agar are sterilized for 15 minutes at 121° C. at a pressure of 15 pounds per square inch (p.s.i.). The agar slants are then cooled to about 28° C., slanted and inoculated with a vegetative growth of a culture, Phoma (ATCC 13145) and incubated at a temperature of 28° C. for 5–7 days.

A two liter Erlenmeyer flask containing 500 milliliters (ml.) of a similarly sterilized and cooled broth of medium No. 1 is then inoculated with spores and vegetative growth suspension from one of the agar slants and incubated from 24 hours to 36 hours at 28° C. on a New Brunswick rotary shaker (manufactured by the New Brunswick Scientific Company, New Brunswick, New Jersey), set at 280 revolutions per minute (r.p.m.). At the end of this period, 500 mg. of 4-pregnene-17α,21-diol-3,20-diol in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with water and acetone, the latter being present as a dispersant which evaporates rapidly. Incubation is continued until paper chromatography indicates complete transformation of 4-pregnene-17α,21-diol-3,20-dione. The broth mixture in the Erlenmeyer flask is then extracted with chloroform to effect the isolation of the crude hydroxylated steroid extract from the broth mixture. The chloroform is then evaporated off in vacuo to yield a crude extract. Twenty grams of this extract is chromatographed over 500 g. of Florisil (magnesium silicate) prepared with hexane. The steroid extract is then dissolved in methylene chloride for placement on the column, and the column eluted successively with methylene chloride, 0.5% methanol in methylene chloride, 1% methanol in methylene chloride, 1.5% methanol in methylene chloride, each elution with each of these compositions being repeated, normally about ten times, until no further steroid is removed in a particular fraction. Increments of 0.5% methanol in methylene chloride are made up to and including elution with 5.0% methanol in methylene chloride. Oils are removed in the methylene chloride fraction. 4-pregnene-11β,17α,21-triol-3,20-dione (Compound F) is removed in the 1.5% methanol fractions. From the 2.5% and 3.0% methanol fractioos 3.3 g. of a mixture of 4-pregnene-6β,17α,21-triol-3,20-dione, 4-pregnene-15β,17α,21-triol-3,20 - dione, 4-pregnene-11α,17α,21-triol-3,20 - dione and 4 - pregnene-11β,17α,21-triol-3,20-dione is obtained. From the latter 3% methanol fractions 2.5 g. of 4-pregnene-11α,17α,21-triol-3,20-dione is recovered. The pure fractions are recovered by recrystallization from acetone and are identified by infra-red comparison with authentic samples. The mixture is characterized by paper chromatography employing the method of Bush as modified by Shull and comparison with pure standards.

4-pregnene-11β,17α,21-triol-3,20-dione is isolated from the mixture obtained above in the 2.5% and 3.0% methanol fractions by acetylation thereof by insertion of the hydroxylated steroid mixture in a beaker with 5 cc. of acetic anhydride and 10 cc. of pyridine. This mixture is permitted to stand over-night. Water is then added to the mixture and the 4-pregnene-11β,17α,21-triol-3,20-dione 21-acetate easily separated therefrom by crystallization from acetone-hexane. The 4-pregnene-11β,17α, 21-triol-3,20-dione 21-acetate is identified by infra-red comparison with an authentic sample.

EXAMPLE 2

*4-Pregnene-11α,17α,21-Triol-3,20-dione and 4-Pregnene-11β,17α,21-Triol-3,20-Dione*

Agar slants containing medium No. 1 described above and 1.5% by weight agar are sterilized for 15 minutes at 121° C. at a pressure of 15 pounds per square inch (p.s.i.). The agar slants are then cooled to about 28° C., slanted and inoculated with a vegetative growth of a culture, Phoma (ATCC 13145) and incubated at a temperature of 28° C. for 5–7 days.

A two liter Erlenmeyer flask containing 500 ml. of a similarly sterilized and cooled broth of medium No. 2 is then inoculated with spores and vegetative growth suspension from one of the agar slants and incubated from 24 hours to 36 hours at 28° C. on a New Brunswick rotary shaker set at 280 r.p.m. At the end of this period, 500 mg. of 4-pregnene-17α,21diol-3,20 dione in 5 ml. of ethanol is added. The flask is replaced on the rotary shaker and incubation continued for a period of from 24 hours to 30 hours during which later period 10 ml. samples removed at intervals from the Erlenmeyer flask and extracted with chloroform are then chromatographed on paper (according to the method of Bush as modified by Shull) employing a toluene/ethyl acetate system, the paper being impregnated with water and acetone, the latter being present as a dispersant which evaporates rapidly. Incubation is continued until chromatography indicates complete transformation of 4-pregnene-17α,21-diol-3,20-dione. The broth mixture in the Erlenmeyer flask is then extracted with chloroform to effect the isolation of the crude hydroxylated steroid extract from the broth mixture. The chloroform is then evaporated off in vacuo to yield a crude extract. 4-pregnene-11α,17α,21-triol-3,20-dione and 4-pregnene-11β,17α-21-triol-3,20-dione are recovered from this extract by column chromatography and crystallization in the manner described in Example 1.

EXAMPLE 3

*4-Pregnene-11α,17α,21-Triol-3,20-Dione and 4-Pregnene-11β,17α,21-Triol-3,20-Dione*

Agar slants containing medium No. 3 described above and 1.5% agar are sterilized for 15 minutes at 121° C. at a pressure of 15 pounds p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 3 is then inoculated with spores and vegetative growth suspension from one of the agar slants and incubated from 24 hours to 36 hours at 28° C. on a New Brunswick rotary shaker set at 280 r.p.m. At the end of this period, 500 mg. of 4-pregnene-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with water and acetone, the latter being present as a dispersant which evaporates rapidly. Incubation is continued until paper chromatography indicates complete transformation of 4-pregnene-17α,21-diol-3,20-dione. The broth mixture in the Erlenmeyer flask is then extracted with chloroform to effect the isolation of the crude hydroxylated steroid extract from the broth mixture. The chloroform is then evaporated off in vacuo to yield a crude extract. 4-pregnene-11α,17α,21-triol-3,20-dione and 4 - pregnene-11β,17α,21-triol-3,20-dione are recovered from this extract by the column chromatography and crystallization procedures described in Example 1.

EXAMPLE 4

*16α-Methylallopregnane-11α,17α,21-Triol-3,20-Dione and 16α-Methylallopregnane-11β,17α,21-Triol-3,20-Dione*

(a) *16α - methylallopregnan - 3β - ol-20-one.*—A solution of 0.5 g. 16α-methylpregnenolone in 15 ml. of acetic acid is reduced at atmospheric pressure with hydrogen and 0.3 g. of 5% palladium on charcoal catalyst. The reaction is stopped after one mole of hydrogen is consumed, the catalyst is removed by filtration, and the filtrate poured into water. The precipitated solid is removed by filtration and crystallized from acetone-hexane to yield 0.3 g. of 16α-methylallopregnan-3β-ol-20-one.

(b) *16α-methylallopregnane-3β,17α-diol-20-one.* — A solution of 3.5 g. of 16α-methylallopregnan-3β-ol-20-one in 100 ml. of acetic anhydride containing 2.0 g. of p-toluene-sulfonic acid is kept at 100° C. for 6 hours; during this time 8 ml. of distillate is removed each half hour by the application of vacuum. The resulting oily residue is dissolved in 50 ml. of benzene and washed three times with water; then with a solution of 1.0 g. of sodium acetate in 15 ml. of water. The benzene layer is then stirred for 18 hours at room temperature with a mixture of 0.25 g. of sodium acetate in 6 ml. of commercial 40% peracetic acid. The excess peracetic acid is destroyed by the dropwise addition of a solution of 8 g. of sodium sulfite in 25 ml. of water, at a temperature of ca. 10–20°. An additional 1 g. of sodium sulfite is then added and the mixture stirred overnight until a starch-iodide test is negative. The benzene layer is separated, washed three times with water and evaporated. The residue is dissolve in 200 ml. of methanol and 30 ml. of water containing 2.7 g. of sodium hydroxide, and the mixture refluxed for 15 minutes. After neutralization with 3 ml. of acetic acid, the solution is concentrated under reduced pressure to a volume of ca. 30 ml., and this is poured into an ice-water mixture. The precipitated solid is removed by filtration and crystallized from methanol-water to give 2.5 g. of 16α-methylallopregnane-3β,17α-diol-20-one.

(c) *16α - methylallopregnane - 3β,17α,21-triol-20-one-21-acetate.*—A solution of 300 mg. of 16α-methylallopregnane-3β,17α-diol-20-one in 15 ml. of chemically pure (C.P.) chloroform (containing a few drops of chloroform previously saturated with hydrogen bromide) is brominated at —20° by the addition (over a two hour period) of 165 mg. of bromine in 10 ml. of chloroform. After removal of the solvent under reduced pressure, 10 ml. of dimethylformamide and one gram of sodium acetate are added. The mixture is stirred at 60–70° C. for 16 hours, then poured into water and the precipitated solid removed by filtration. Crystallization from acetone-hexane to give 200 mg. of 16α-methylallopregnane-3β,17α,21-triol-20-one 21-acetate.

(d) *16α - methylallopregnane - 17α,21-diol-3,20 - dione 21-acetate.*—A solution of 3.5 g. of 16α-methylallopregnane-3β,17α,21-triol-20-one in 20 ml. of 80% acetone-water is cooled to 10° C. One drop of concentrated hydrochloric acid is added along with 200 mg. of N-bromoacetamide, and the mixture allowed to stand in the ice-box for 20 hours. Excess sodium sulfite solution is then added, and the mixture concentrated under reduced pressure to a small volume to precipitate a crude product. This is crystallized from acetone-hexane to yield 3.0 g. of 16α - methylallopregnane - 17α,21-diol-3,20-dione 21-acetate.

(e) *16α-methylallopregnane-17α,21-diol-3,20-dione.*— One gram of 16α-methylallopregnane-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16α-methylallopregnane-17α,21-diol-3,20-dione.

(f) *16α - methylallopregnane - 11α,17α,21-triol-3,20-dione and 16α - methylallopregnane - 11β,17α,21-triol-3,20-dione.*—Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16α-methylallopregnane-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone and water. Incubation is continued until paper chromatography indicates transformation of 16α-methylallopregnane-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude extract. 16α - Methylallopregnane - 11α,17α,21-triol-3,20-dione and 16α-methylallopregnane-11β,17α,21-triol-3,20-dione are recovered from this extract by column chromatography and crystallization as described in Example 1.

EXAMPLE 5

*16β-Methylallopregnane-11α,17α,21-triol-3,20-dione and 16β-Methylallopregnane-11β,17α,21-triol-3,20-dione*

(a) *16β - methylallopregnane - 3β - ol - 20 - one.*—In the manner described in Example 4(a), 16β-methylpregnenolone is reduced to 16β-methylallopregnan-3β,ol-20-one by means of hydrogen and a palladium catalyst.

(b) *16β-methylallopregnane-3β,17α-diol-20-one.* — In the manner described in Example 4(b), 16β-methylallopregnane-3β-ol-20-one is enol-acetylated, peroxidized and hydrolized to give 16β-methylallopregnane-3β,17α-diol-20-one.

(c) *16β - methylallopregnane - 3β,17α21 - triol - 20-one 21-acetate.*—In the manner described in Example 4(c), 16β-methylallopregnane-3β,17α-diol-20-one is brominated and acetoxylated at C-21 to give 16β-methylallopregnane-3β,17α,21-triol-20-one 21-acetate.

(d) *16β - methylallopregnane - 17α,21 - diol - 3,20-dione 21-acetate.*—In the manner described in Example 4(d), 16β - methylallopregnane - 3β,17α,21 - triol - 20-one 21-acetate is oxidized to give 16β-methylallopregnane-17α,21-diol-3,20-dione 21-acetate.

(e) *16β - methylallopregnane - 17α,21 - diol - 3,20-dione.*—One gram of 16β-methylallopregnane-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16β-methylallopregnane-17α,21-diol-3,20-dione.

(f) *16β - methylallopregnane - 11α,17α,21 - triol - 3,20-dione and 16β-methylallopregnane-11β,17α,21-triol-3,20-dione.*—Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16β-methylallopregnane-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone and water. Incubation is continued until paper chromatography indicates transformation of 16β-methylallopregnane-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude extract. 16β - methylallopregnane - 11α,17α,21 - triol-3,20-dione and 16β-methylallopregnane-11β,17α,21-triol-3,20-dione are recovered from this extract by column chromatography and crystallization as described in Example 1.

EXAMPLE 6

*16α - Tert. - Butylallopregnane - 11α,17α,21 - Triol - 3,20-dione and 16α-Tert.-Butylallopregnane-11β,17α,21-Triol-3,20-dione*

(a) *16α-tert.-butylallopregnan-3β,ol-20-one.* — In the manner described in Example 4(a), 16α-tert.-butylpregnenolone is reduced to 16α-tert.-butylallopregnan-3β-ol-20-one by means of hydrogen and a palladium catalyst.

(b) *16α-tert.-butylallopregnane-3β,17α-diol-20 - one.*— In the manner described in Example 4(b), 16α-tert.-butylallopregnane-3β-ol-20-one is enol-actylated, peroxidized and hydrolyzed to give 16α-tert.-butylallopregnane-3β,17α-diol-20-one.

(c) *16α-tert.-butylallopregnane-3β,17α,21-triol-20 - one 21-acetate.*—In the manner described in Example 4(c), 16α-tert.-butylallopregnane-3β,17α-diol-20-one is brominated and acetoxylated at C–21 to give 16α-tert.-butylallopregnane-3β,17α,21-triol-20-one 21-acetate.

(d) *16α-tert.-butylallopregnane-17α,21-diol-3,20 - dione 21-acetate.*—In the manner described in Example 4(d), 16α-tert-butylallopregnane-3β,17α,21-triol-20-one 21 - acetate is oxidized to give 16α-tert.-butylallopregnane-17α,21-diol-3,20-dione 21-acetate.

(e) *16α-tert.-butylallopregnane-17α,21-diol-3,20 - dione.*—One gram of 16α-tert.-butylallopregnane-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16α-tert.-butylallopregnane-17α,21-diol-3,20-dione.

(f) *16α-tert.-butylallopregnane-11α,17α,21-triol - 3,20-dione and 16α-tert.-butylallopregnane-11β,17α,21-triol-3,20-dione.*—Agar slants containing medium No. 3 described above and 1.5% agar are sterilized for 15 minutes at 121° C. at a pressure of 15 p.s.i. The agar slants are then cooled to about 28° C., slanted and inoculated with a vegetative growth of a culture Phoma and incubated at a temperature of 28° C. for 5–7 days.

A two liter Erlenmeyer flask containing 500 ml. of a similarly sterilized and cooled broth of medium No. 2 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16α-tert.-butylallopregnane-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone and water. Incubation is continued until paper chromatography indicates transformation of 16α-tert.-butylallopregnane-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude extract. 16α-tert. butylallopregnane-11α,17α,21-triol - 3,20-dione and 16α-tert.-butylallopregnane-11β,17α,21-triol-3,20-dione are recovered from this extract by column chromatography and crystallization as described in Example 1.

EXAMPLE 7

*16β-Ethylallopregnane-11α,17α,21-Triol-3,20 - Dione and 16β-Ethylallopregnane-11β,17α,21-Triol-3,20-Dione*

(a) *16β-ethylallopregnan-3β-ol-20-one.*—A solution of 3.0 g. of 16-dehydropregnenolone in 6 ml. of methylene chloride is added to a solution of about 1 g. of diazoethane in 50 ml. of ether at about 0° C. The mixture is kept at this temperature for 6 hours, then allowed to warm to room temperature. Removal of the solvent leaves a residue of the intermediate pyrazoline, which is not further purified, but heated under reduced pressure to ca. 200° C. until the evolution of nitrogen ceases. The resulting oil is crystallized from ether to give 2.0 g. of 16-ethyl-16-dehydropregnenolone. This is dissolved in 50 ml. of acetic acid, then reduced with hydrogen and a palladium on charcoal catalyst until 2 moles of hydrogen have been absorbed. The catalyst is removed by filtration, and the filtrate poured into water. The precipitated solid is removed by filtration and crystallized from methanol-water to yield 1.5 g. of 16β-ethylallopregnan-3β-ol-20-one.

(b) *16β-ethylallopregnane-3β,17α-diol-20-one.*—In the manner described in Example 4(b), 16β-ethylallopregnan-3β-ol-20-one is enol-acetylated, peroxidized and hydrolyzed to give 16β-ethylallopregnane-3β,17α-diol-20-one.

(c) *16β-ethylallopregnane-3β,17α,21-triol-20 - one 21-acetate.*—In the manner described in Example 4(c), 16β-ethylallopregnane-3β,17α-diol-20-one is brominated and acetoxylated at C–21 to give 16β-ethylallopregnane-3β,17α,21-triol-20-one 21-acetate.

(d) *16β-ethylallopregnane-17α-21-diol-3,20 - dione 21-acetate.*—In the manner described in Example 4(d), 16β-ethylallopregnane-3β,17α,21-triol-20-one 21-acetate is oxidized to give 16β-ethylallopregnane-17α,21-diol-3,20-dione 21-acetate.

(e) *16β-ethylallopregnane-17α,21-diol-3,20 - dione.*—One gram of 16β-ethylallopregnane-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16β-ethylallopregnane-17α,21-diol-3,20-dione.

(f) *16β - ethylallopregnane - 11α,17α,21 - triol - 3,20-dione and 16β-ethylallopregnane-11β,17α,21-triol-3,20-dione.*—Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16β-ethylallopregnane-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone and water. Incubation is continued until paper chromatography indicates transformation of 16β-ethylallopregnane-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude extract. 16β-ethylallopregnane-11α,21 - triol - 3,20 - dione and 16β-ethylallopregnane-11β,17α,20-dione are recovered from this extract by column chromatography and crystallization as described in Example 1.

EXAMPLE 8

*16α - Methyl - 1,4 - Pregnadiene - 11α,17α, 21-Triol-3,20-Dione and 16α-Methyl-1,4-Pregnadiene-11β,17α,21-Triol-3,20-Dione*

(a) *16α - methyl - 1,4 - pregnadiene - 17α,21 - diol-3,20-dione 21-acetate.*—A solution of 200 mg. of 16α-methylallopregnane-17α,21-diol-3,20-dione 21-acetate obtained as described in Example 4(a–d) in 5 ml. of dioxane is dibrominated in positions 2 and 4 by the rapid addition of 130 mg. of bromine in 1 ml. of dioxane at room temperature. After ½ hour, the solution is poured into water and the precipitated solid removed by filtration and dried. Without further purification, this is dehydrobrominated by refluxing for 2 hours with 4 ml. of dimethylformamide containing 50 mg. of lithium carbonate and 50 mg. of lithium bromide. The mixture is then poured into dilute hydrochloric acid and is extracted with methylene chloride. The organic extracts are evaporated to a residue which is crystallized from methanol-water to yield 100 mg. of 16α-methyl-1,4-pregnadiene-17α,21-diol-3,20-dione 21-acetate.

(b) *16α - methyl - 1,4 - pregnadiene - 17α,21 - diol-3,20-dione.*—One gram of 16α-methyl-1,4-pregnadiene-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16α-methyl-1,4-pregnadiene-17α,21-diol-3,20-dione.

(c) *16α - methyl - 1,4 - pregnadiene - 11α,17α,21 - triol-3,20-dione and 16α-methyl-1,4-pregnadiene-11β,17α,21-triol-3,20-dione.*—Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16α-methyl-1,4-pregnadiene-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toulene/ethyl acetate solvent system, the paper being impregnated with acetone and water. Incubation is continued until paper chromatography indicates complete transformation of 16α-methyl-1,4-pregnadiene-17α,21-diol-3,20-dione. The broth mixture in the Erlenmeyer flask is then extracted with chloroform to effect the isolation of the 11-hydroxylated steroid from the broth mixture. The chloroform is then evaporated off in vacuo to yield a crude extract. 16α-methyl-1,4-pregnadiene-11α,17α,21 - triol - 3,20 - dione and 16α-methyl-1,4-pregnadiene-11β,17α,21-triol - 3,20 - dione are recovered from this extract by column chromatography and crystallization as described in Example 1.

EXAMPLE 9

*16β - Methyl - 1,4 - Pregnadiene - 11α,17α,21 - Triol-3,20-Dione and 16β-Methyl-1,4-Pregnadiene-11β,17α-21-Triol-3,20-Dione*

(a) *16β - methyl - 1,4 - pregnadiene - 17α,21 - diol-3,20-dione 21-acetate.*—In the manner described in Example 8(a), 16β-methylallopregnane-17α,21-diol-3,20-dione 21-acetate obtained by the procedure described in Example 5(a–d) is dibrominated in positions 2 and 4, then dehydrobrominated to give 16β-methyl-1,4-pregnadiene-17α,21-diol-3,20-dione 21-acetate.

(b) *16β - methyl - 1,4 - pregnadiene - 17α,21 - diol-3,20-dione.*—One gram of 16β-methyl-1,4-pregnadiene-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16β-methyl-1,4-pregnadiene-17α,21-diol-3,20-dione.

(c) *16β - methyl-1,4-pregnadiene-11α,17α,21-triol-3,20-dione and 16β-methyl - 1,4 - pregnadiene-11β,17α,21-triol-3,20-dione.*—Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16β-methyl-1,4-pregnadiene-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone and water. Incubation is continued until paper chromatography indicates transformation of 16β-methyl-1,4-pregnadiene-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude extract. 16β-methyl - 1,4 - pregnadiene-11α,17α,21-triol-3,20 - dione and 16β-methyl-1,4-pregnadiene-11β,17α,21-triol-3,20-dione are removered from this extract by column chromatography and crystallization as described in Example 1.

EXAMPLE 10

*16α-Tert.-Butyl - 1,4 - Pregnadiene-11α,17α,21-Triol-3,20-Dione and 16α-Tert.-Butyl-1,4-Pregnadiene-11β,17α,21-Triol-3,20-Dione*

(a) *16α-tert.-butyl - 1,4 - pregnadiene-17α,21-diol-3,20-dione 21-acetate.*—In the manner described in Example 8(a), 16α - tert.-butylallopregnane-17α,21-diol-3,20-dione 21-acetate obtained by the procedure described in Example 6(a-d) is dibrominated in positions 2 and 4, then dehydrobrominated to give 16α - tert. - butyl - 1,4-pregnadiene-17α,21-diol-3,20-dione 21-acetate.

(b) *16α-tert.-butyl - 1,4 - pregnadiene-17α,21-diol-3,20-dione.*—One gram of 16α-tert.-butyl-1,4-pregnadiene-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resulting precipitate is filtered and dried. Crystallization from acetone-hexane gives 16α-tert.-butyl-1,4-pregnadiene-17α,21-diol-3,20-dione.

(c) *16α-tert.-butyl - 1,4 - pregnadiene-11α,17α,21-triol-3,20-dione and 16α-tert.-butyl-1,4-pregnadiene-11β,17α,21-triol-3,20-dione.*—Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16α-tert.-butyl-1,4-pregnadiene-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone and water. Incubation is continued until paper chromatography indicates transformation of 16α-tert.-butyl-1,4-pregnadiene-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude extract. 16α-tert.-butyl-1,4-pregnadiene-11α,17α,21-triol-3,20-dione and 16α-tert.-butyl-1,4-pregnadiene-11β,7α,2-triol-3,20-dione are recovered from this extract by column chromatography and crystallization as described in Example 1.

EXAMPLE 11

*16β - Ethyl-1,4-Pregnadiene-11α,17α,21-Triol-3,20-Dione and 16β - Ethyl-1,4-Pregnadiene-11β,17α,21-Triol-3,20-Dione*

(a) *16β - ethyl-1,4-pregnadiene-17α,21-diol-3,20-dione 21-acetate.*—In the manner described in Example 8(a), 16β - ethylallopregnane-17α,21-diol-3,20-dione 21-acetate obtained by the procedure described in Example 7(a–d) is dibrominated in positions 2 and 4, then dehydrobrominated to give 16β-ethyl-1,4-pregnadiene-17α,21-diol-3,20-dione 21-acetate.

(b) *16β - ethyl - 1,4 - pregnadiene - 17α,21-diol-3,20-dione.*—One gram of 16β-ethyl-1,4-pregnadiene-17α,21-diol-3,20-dione 21-acetate is dissolved in 25 ml. of methanol and 5 ml. of water containing 0.2 g. of potassium bicarbonate. This solution is refluxed for ½ hour, then concentrated under reduced pressure. Water is added to the residue, and the resultnig precipitate is filtered and dried. Crystallization from acetone-hexane gives 16β-ethyl-1,4-pregnadiene-17α,21-diol-3,20-dione.

(c) *16β - ethyl - 1,4 - pregnadiene - 11α,17α,21 - triol-3,20 - dione and 16β-ethyl-1,4-pregnadiene-11β,17α,21-triol-3,20-dione.*—Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16β-ethyl-1,4-pregnadiene-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone and water. Incubation is continued until chromatography indicates transformation of 16β-ethyl-1,4-pregnadiene-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude extract. 16β-ethyl-1,4-pregnadiene-11α,17α,21-triol-3,20-dione and 16β-ethyl-1,4-pregnadiene-11β,17α,21-triol-3,20-dione are recovered from this extract by column chromatography and crystallization as described in Example 1.

EXAMPLE 12

*16α-Methyl-4-Pregnene-11α,17α,21-Triol-3,20-Dione and 16α-Methyl-4-Pregnene-11β,17α,21-Triol-3,20-Dione*

(a) *16α - methyl - 5,6 - dichloro - pregnane - 3β - ol-20-one 3-acetate.*—A solution containing 5.6 g. (0.0155 mole) of 16α-methyl-pregnenolone-3-acetate in 5 ml. of pyridine and 150 ml. of carbon tetrachloride is cooled to −23° C. To this stirred solution is added dropwise over a ten minute period 1.16 g. (0.016 mole) of chlorine contained in 20 ml. of carbon tetrachloride. The reaction solution is then allowed to warm to approximately 15° C. while maintaining the stirring. Methylene chloride (70 ml.) is then added and the solution is washed successively with dilute hydrochloric acid, water, aqueous sodium bicarbonate, and then water. The organic phase is dried over magnesium sulfate, filtered, and the filtrate evaporated to near dryness, and treated with methanol, whereupon there is obtained 16α-methyl-5,6-dichloro-pregnane-3β-ol-20-one-3-acetate, M.P. 195–196° C.

(b) *16α - methyl - 5,6 - dichloro - pregnane - 3,17α-diol-20-one-3-acetate.*—To 125 ml. of acetic anhydride is added 5.0 g. (0.0111 mole) of 16α-methyl-5,6-dichloro-pregnane-3β-ol-20-one-3-acetate and 1.0 g. (0.0053 mole) of p-toluenesulfonic acid monohydratae. The solution is refluxed for 6 hours while maintaining a constant distillation rate so that there is collected during this time 100 ml. of distillate. The reaction solution is cooled and poured into 400 ml. of water and the mixture stirred in order to facilitate the hydrolysis of the acetic anhydride. The aqueous mixture is extracted two times with 100 ml. portions of benzene. The combined benzene solution is washed two times with 50 ml. portions of water and one time with 50 ml. of a 2% solution of sodium acetate in water. The organic phase is dried over magnesium sulfate and filtered. The filtrate is concentrated under vacuum to a volume of 70 ml. of benzene and then stirred for 19 hours with a mixture of 0.52 g. of sodium acetate in 12 ml. of commercial 40% peracetic acid. Excess peracetic acid is then destroyed by the dropwise addition of a solution of 15.6 g. of sodium sulfite in 53 ml. of water, while maintaining the temperature between 10–20° C. An additional 1.7 g. of sodium sulfite is then added, and the mixture is stirred until a starch-iodide test is negative. The benzene layer is separated, washed three times with water, and evaporated. To the residue is added 200 ml. of methanol and 20 ml. of water containing 6.2 g. of potassium bicarbonate. The reaction solution is refluxed for 2 hours, and after the addition of 4 ml. of acetic acid, is concentrated under vacuum to a volume of 40 ml., which is distilled with 20 volumes of water. Separation of the resultant precipitate and crystallization from ethyl acetate affords 16α-methyl-5,6-dichloro-3β,17α-diol-20-one, M.P. 216–217° C.

(c) *16α - methyl - 5,6 - dichloro - pregnane - 20 - one-3β,17α,21-triol-21-acetate.*—To a solution containing 1.0 g. (0.0024 mole) of 16α-methyl-5,6-dichloro-pregnane-20-one-3β,17α-diol-20-one in 50 ml. of C.P. chloroform (containing a few drops of chloroform previously saturated with hydrogen bromide) maintained at 20° C. is added (over a 20 minute period) 0.396 g. of bromine in 6 ml. of chloroform. The solution is stirred an additional 20 minutes and then washed 3 times with water, dried over magnesium sulfate, and filtered. The filtrate is concentrated under vacuum to 20 ml. and stirred at 45° C. with 20 ml. of methanol and 0.72 g. (0.0048 mole) of sodium iodide for 1 hour and thirty minutes. Water is added and the mixture extracted with chloroform. The combined chloroform extracts are washed with water, dried over magnesium sulfate, and filtered. The filtrate is evaporated to dryness and the residue dissolved in 40 ml. of acetone and 2 ml. of water containing 0.72 g. (0.0063 mole) of potassium acetate. The solution is refluxed for 18 hours, evaporated to near dryness and water added. The resultant precipitate is filtered, washed with water, and then crystallized from isopropanol to yield 16α-methyl-5,6-dichloro-pregnane-20-one-3β,17α,21-triol-21-acetate.

(d) *16α-methyl-5,6-dichloro-pregnane-17α,21-diol-3,20-dione-21-acetate.*—To a stirred solution of 1.5 g. of 16α-methyl-5,6-dichloro-pregnane-20-one-3β,17α,21-triol 21-acetate in 40 ml. of acetic acid and 4 ml. of water maintained at 10° C. is first added over a 20 minute period a solution containing 0.34 g. of chromium trioxide in 5 ml. of acetic acid and 0.5 ml. of water, and then over a 4 minute period 0.19 ml. of concentrated sulfuric acid. The reaction mixture is stirred for two hours, then diluted with water, and extracted with chloroform. The combined chloroform extracts (150 ml.) are washed successively with water (70 ml.) three times with a 3% sodium bicarbonate solution and finally with 60 ml. of water. The chloroform solution is dried over magnesium sulfate and evaporated to dryness. The residue upon crystallization from acetone-hexane affords 16α-methyl-5,6-dichloro-pregnane-17α,21-diol-3,20-dione 21-acetate.

(e) *16α-methyl-4-pregnene-17α,21-diol-3,20-dione-21-acetate.*—To a stirred solution of 1.5 g. of 16α-methyl-5,6-dichloro-pregnane-17α,21-diol-3,20-dione 21 - acetate in 100 ml. of acetic acid maintained at 75° C. there is added 1 g. of zinc dust, followed after 45 minutes by an additional gram of zinc dust. After another 45 minutes at 75° C., the reaction solution is filtered to remove the insoluble zinc. The filtrate is air-evaporated to approximately 5 ml. and then diluted with 30 ml. of water. The resultant precipitate is filtered, washed with water, and after crystallization from acetone-hexane affords 16α-methyl-4-pregnene-17α,21-diol-3,20-dione-21-acetate.

(f) *16α - methyl-4-pregnene-17α,21-diol-3,20-dione.*— Method 1: One gram of 16α-methyl-4-pregnene-17α,21-diol-3,20-dione 21-acetate is dissolved in 25 ml. of methanol and 5 ml. of water containing 0.19 g. of potassium bicarbonate. This solution is refluxed for 35 minutes and then after the addition of 0.12 ml. of acetic acid is concentrated under vacuum to a residue, to which 15 ml. of water is added. The resulting precipitate is filtered and dried. Crystallization from acetone-hexane gives 16α-methyl-4-pregnene-17α,21-diol-3,20-dione.

Method II: Alternatively, 16α-methyl-4-pregnene-17α,21-diol-3,20-dione is prepared from 16α-methyl-5,6-dichloro-pregnane-20-one-3β,17α,21-triol 21 - acetate as follows:

To a solution of 1.0 g. of 16α-methyl-5,6-dichloropregnane-20-one-3β,17α,21-triol-21-acetate in 150 ml. acetone under an atmosphere of carbon dioxide there is added a solution of chromous chloride (prepared from 40 g. of amalgamated zinc dust, 8 ml. concentrated hydrchloric acid, 80 ml. of water and 20 g. chromic chloride). After standing at room temperature for two hours, 20 ml. of water is added and the solution is evaporated to approximately 10 ml., diluted with 30 ml. of water, and extracted three times with 30 ml. portions of methylene chloride. The combined methylene chloride extracts are washed with water and then dried over magnesium sulfate and filtered. The filtrate is evaporated to a crystalline residue, which upon treatment with acetone-hexane gives 16α - methyl-5-pregnene-20-one-3β,17α,21-triol-21-acetate, which is then employed in the following procedure:

A medium having a composition of 10 grams of yeast extract (Difco), 4.5 g. of potassium dihydrogen phosphate and 4.7 g. of disodium hydrogen phosphate monohydrate is diluted to 1 liter with tap water, dispersed in aliquots of 100 ml. into 300 ml. Erlenmeyer flasks and sterilized for 20 minutes at 15 pounds steam pressure. The pH after sterilization is 6.8.

The sterile medium in the flasks is inoculated with an agar slant of *Flavobacterium dehydrogenans* var. *hydrolyticum* classified in the Rutgers Collection as No. 130, Rutgers University, New Brunswick, New Jersey, or with 1% by volume of a 24-hour broth culture thereof. The inoculated flask is placed in a shaking machine set at 248 strokes per minute, in an incubator kept at 30° C. The shake cultures are subjected to continuous illumination.

12 to 24 hours later, 200 mg. of 16a-methyl-5-pregnene-20-one-3β,17α,21-triol 21-acetate dissolved in 5 ml. of 95% ethanol is added to each flask. The pH is now 7.2 to 7.4.

After 60 hours of shaking, the fermentation is stopped. The final pH is 7.5–7.8. The pH is then adjusted to 3.5 with hydrochloric acid and the fermentation liquors autoclaved for 15 minutes at 15 pounds steam pressure. After cooling, the broth is filtered with the aid of 2% of "Filter-Cel" (i.e. diatomaceous earth). Both the filtrate and the filter cake are extracted thoroughly with chloroform and the combined extracts evaporated to dryness in vacuo. The combined residual solid from the ten flasks is crystallized from acetone-hexane to give 16α-methyl-4-pregnene-17α,21-diol-3,20-dione.

Alternatively, 16α-methyl-5-pregnene-20-one-3β,17α,21-triol 21-acetate (1.9 g.) is dissolved in 200 ml. of acetone (distilled from permanganate) and cooled to 10–15° C. under an atmosphere of nitrogen. To this stirred solution is added rapidly, but dropwise, 1.4 ml. of standard chromium trioxide reagent (prepared from 13.36 g. of chromium trioxide in 11.5 ml. of concentrated sulfuric acid diluted with water to a volume of 50 ml.). After 5 minutes, water is added and the resulting precipitate is washed well with water. In this manner there is obtained 16α-methyl-5-pregnene-17α,21-diol-3,20-dione. When 1.0 g. of this latter substance is treated with 0.3 g. of potassium bicarbonate in 40 ml. of methanol and 4 ml. of water at reflux for 35 minutes under a nitrogen atmosphere, there is obtained, after separation by standard procedure the desired 16α-methyl-4-pregnene17α,21-diol-3,20-dione.

(g) *16α-methyl-4-pregnene-11α,17α,21-triol-3,20-dione and 16α-methyl-4-pregnene-11β,17α,21-triol-3,20-dione.*— Agar slants containing medium No. 1 described above and 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period, 500 mg. of 16α-methyl-4-pregnene-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with acetone as a dispersant and water. Incubation is continued until paper chromatography indicates a complete transformation of 16α - methyl - 4 - pregnene - 17α,21 - diol - 3,20 - dione. The broth mixture in the Erlenmeyer flask is then extracted with chloroform to effect the isolation of the 11-hydroxylated steroid from the broth mixture. The chloroform is then evaporated off in vacuo to yield a crude extract. 16α-methyl-4-pregnene-11α,17α,21-triol-3,20-dione and 16α-methyl-4-pregnene-11β,17α,21-triol-3.20-dione are recovered from this extract by column chromatography and crystallization as described in Example 1.

EXAMPLE 13

*16β-Methyl-4-Pregnene-11α,17α,21-Triol-3,20-Dione and 16β-Methyl-4-Pregnene-11β,17α,21-Triol-3,20-Dione*

(a) *16β - methyl - 16α,17α - epoxy - 5 - pregnen - 3β - ol-20-one.*—To a stirred solution of 395 g. (1.2 mole) of 16β-methyl-5,16-pregnadien-3β-ol-20-one in a mixture of 1200 ml. of chloroform and 3000 ml. of methanol was added 75.4 ml. of 50% sodium hydroxide 300 ml. of water and 540 ml. of 30% hydrogen peroxide. After stirring for 72 hours at room temperature, 1500 ml. of water were added and the mixture was then neutralized with acetic acid. The organic solvents were removed by steam distillation and the crude product after filtration and drying weighed 386 g. (83.3%), M.P. 181–186°, $[\alpha]_D^{25}$ −5.8 (1% dioxane). Ultra-violet adsorption spectrum showed the presence of less than 1% starting material. The crude product upon recrystallization from methanol showed no ultra-violet adsorption, M.P. 190° (Kofler hot bench).

(b) *3β - acetoxy - 16β - methyl - 16α,17α - epoxy - 5 - pregnene-20-one.*—A solution of 756 g. of the crude epoxy compound in 2000 ml. of dry pyridine and 657 ml. of acetic anhydride was kept at 60° C. for 4 hours. After approximately one hour, crystals of the acetate appeared. The acetylation mixture was poured into ice water and the product filtered and dried to give a yield of 712 g., M.P. 163–174°. Recrystallization from acetone gave a product without ultra-violet adsorption; yield 557 g. (75.5%), M.P. 180–182° C., $[\alpha]_D^{25}$ −16.7 (1% dioxane).

(c) *3β - acetoxy - 16 - methylene - 5 - pregnen - 17α - ol-20-one.*—To a stirred solution of 275 g. (0.71 mole) of 3β-acetoxy-16β-methyl-16α,17α-epoxy pregnene-20-one in 6000 ml. of glacial acetic acid at 27° C. was added 6.05 g. of HBr (0.075 mole) in 100 ml. of glacial acetic acid. Within one minute crystallization of the product ensued. After stirring an additional 5 minutes, the 16-methylene compound was filtered, washed with 80% aqueous acetic acid and finally with water. The product was dried at 110° C. under vacuum to break the acetic acid solvate; yield 207 g. (76.4%), M.P. 200° Kofler hot bench, $[\alpha]_D^{25}$ −109° (1% dioxane). The acetic acid mother liquor, not including the water wash, was treated with 8 g. of potassium acetate to neutralize the HBr present. The column was reduced to approximately one liter and cooled to give an additional 34 g. of product, melting at 200° (Kofler hot bench), $[\alpha]_D^{25}$ −95 (1% dioxane). This was an overall yield of 88.9% on the two fractions of 3β-acetoxy-16-methylene-5-pregnene-17α-ol-20-one. The sample for analysis was recrystallized from acetone, M.P. 199–201° C., 200° C. (Kofler hot bench) $[\alpha]_D^{25}$ −110° (1% dioxane).

(d) *3β - acetoxy - 16β - methyl - 5 - pregnen - 17α - ol-20-one.*—A solution of 367 g. (0.95 mole) of the 3β-acetoxy-16-methylene-5-pregnene-17α-ol-20-one in 4.67 l. of tetrahydrofuran containing 59.7 ml. of triethylamine was hydrogenated under 10 pounds' pressure at 23° C. in the presence of 184 g. of 5% palladium on carbon catalyst. After 100 minutes, the absorption of hydrogen stopped at 1 mole. The sterol solution, after removal of the catalyst, was concentrated under reduced pressure to a heavy slurry of crystals, and then 2.5 l. of hexane was added. The pure product, 3β-acetoxy-16β-methyl-5-pregnene-17α-ol-20-one, was filtered and washed with hexane to give 315 g. (85.7%), M.P. 168° C. (Kofler hot bench), $[\alpha]_D^{25}$ −17.9° (1% dioxane). The mother liquor upon concentration gave an additional 34 g. of pure product; M.P. 169° (Kofler hot bench), $[\alpha]_D^{25}$ −16.5° (1% dioxane). This was an overall yield of 94.5%.

The analytical sample was recrystallized from acetone-hexane, M.P. 169–170° C., $[\alpha]_D^{25}$ −20.6 (1% dioxane).

*Analysis.*—Found: C, 74.06; H, 9.2. Calcd.: C, 74.30; H, 9.15.

(e) *16β - methyl - 5 - pregnene - 3β,17α - diol - 20 - one.*—To a refluxing solution of 50 g. of 3β-acetoxy-16β-methyl-5-pregnene-17α-ol-20-one in 2500 ml. of methanol was added 25 g. of sodium hydroxide dissolved in 250 ml. water. Crystallization took place almost immediately. The reaction was stirred at reflux for 10 minutes and then acidified with 40 ml. of acetic acid. The slurry was poured into 4 l. of ice water, filtered, and washed neutral to give 43 g. (97%) of crude product melting with decomposition at 253–260° (Kofler hot bench), $[\alpha]_D^{25}$ −16.8. Recrystallization from methanol gave 40.3 g. of 16β-methyl-5-pregnene-3β,17α-diol-20-one melting at 260° (Kofler hot bench).

(f) *3β,21-diacetoxy-16β-methyl-5-pregnene-17α-ol - 20-one.*—A solution of 163 g. of bromine (1.02 moles) in 500 ml. of chloroform was added dropwise over a 25 minute period to 194.3 g. (0.5 mole) of 16β-methyl-5-pregnene-3β,17α-diol-20-one 3-acetate in 1750 ml. of chloroform with stirring at 25–30° C. Stirring was continued for an additional 5 minutes when decolorization was complete. The solution was neutralized with 100 g. of solid sodium bicarbonate and filtered. The chloroform solution of the 5,6,21-tribromo compound was concentrated to 1400 ml. under reduced pressure below 40° C. Methanol (1250 ml.) and 375 g. of sodium iodide were added and the mixture was stirred for one hour at 43° to 48° C. The reaction mixture was cooled to 10° C. by the addition of 3750 ml. of ice water and 125 g. of sodium bicarbonate was added. With good mechanical agitation 8.5% hydrazine hydrate solution was added dropwise until the iodine color was discharged. The hydrazine hydrate required (140 ml.) calculated to be 92% of the theoretical amount. The chloroform layer was separated from the aqueous phase and concentrated to almost dryness under reduced pressure below 40° C. The crude 21-iodo compound was then stirred 17 hours at refluxing temperatures with 1250 ml. of acetone, 250 ml. of water and 100 g. of potassium acetate. The acetone was then removed by steam distillation and the resulting crystalline product filtered and dried. The crude product was dissolved in 7 l. of ethyl ether, treated with decolorizing charcoal, and the product was finally crystallized from a mixture of ether-hexane. The product, 3β,21-diacetoxy-16β-methyl-5-pregnene-17α-ol-20-one was filtered and dried at 95° C. under vacuum to give 127 g. (57%), M.P. 170° C. (Kofler hot bench), $[\alpha]_D^{25}$ +15° (1% dioxane).

(g) *16β-methyl-17α,21-dihydroxy-4 - pregnene - 3,20-dione.*—A medium having a composition of 10 g. of yeast extract (Difco), 45 g. of potassium dihydrogen phosphate and 4.7 g. of disodium hydrogen phosphate monohydrate is diluted to 1 liter with tap water, dispersed in aliquots of 100 ml. into 300 ml. Erlenmeyer flasks and sterilized for 20 minutes at 15 pounds' steam pressure. The pH after sterilization is 6.8.

The sterile medium in the flasks is inoculated with agar slant of *Flavobacterium dehydrogenans* var. *hydrolyticum* (Rutgers Collection No. 130) or with 1% by volume of a 24 hour broth culture. The inoculated flask is placed in a shaking machine set at 248 strokes per minute, in an incubator kept at 30° C. The shake cultures are subject to continuous illumination.

Twelve to twenty-four hours later, 200 mg. of 16β-methyl-3β,21-diacetoxy-17α-hydroxy-5-pregnen-20 - one dissolved in 5 ml. of 95% ethanol is added to each flask. The pH is now 7.2–7.4.

After 60 hours of shaking, the fermentation is stopped. Reaction was followed by specific rotation until complete and the sterol extracted from the fermentation broth with ethyl acetate. The extracts were evaporated to dryness and sludged in 10 volumes of ethyl ether to remove impurities and unconverted starting material to give a substantially pure 16β-methyl-17α,21-dihydroxy-4-pregnene-3,20-dione, M.P. 219° C.–200° C., $[\alpha]_D^{25}$ 130° C. (c.= 1% dioxane).

(h) *16β-methyl-4-pregnene - 11α,17α,21 - triol - 3,20-dione* and *16β-methyl-4-pregnene-11β,17α,21-triol - 3,20-dione.*—Agar slants containing medium No. 1 described above 1.5% agar are sterilized for 15 minutes at 121° C. at a pressure of 15 p.s.i. The agar slants are then cooled to about 28° C., slanted and inoculated with a vegetative growth of a culture Phoma (ATCC 13145) and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16β-methyl-4-pregnene-17α,21-diol-3,20-dione in 5 ml. of ethanol is added. The flask is replaced on the rotary shaker and incubation is continued for a period of from 24 hours to 30 hours during which latter period 10 ml. samples removed at intervals from the Erlenmeyer flask and extracted with chloroform are then chromatographed on paper (according to the method of Bush as modified by Shull), employing a toluene/ethyl acetate solvent system, the paper being impregnated with acetone and water. Incubation is continued until paper chromatography indicates transformation of the 16α-methyl-4-pregnene-17α,21-diol-3,20-dione and completion of the reaction. The broth mixture in the Erlenmeyer flask is then extracted with chloroform to effect the isolation of the 11-hydroxylated steroid from the broth mixture. The chloroform is then evaporated off in vacuo to yield a crude steroid extract. 16β-methyl-4-pregnene-11α,17α,21-triol-3,20-dione and 16β-methyl-4-pregnene-11β,17α,21-triol-3,20-dione are recovered from this extract by column chromatography and crystallization as described in Example 1.

These latter compounds are converted to their corresponding 1,4-dienes, 16β-methyl-1,4-pregnadiene-11α,17α,21-triol-3,20-dione and 16β-methyl-1,4-pregnadiene-11β,17α,21-triol-3,20-dione by reaction with *Corynebacterium simplex* by the procedure described in United States Patent 2,837,464, issued June 3, 1958, to Arthur Nobile.

EXAMPLE 14

*16β-Methyl-4-Pregnene-11α,17α,21-Triol-3,20-Dione and 16β-Methyl-4-Pregnene-11β,17α,21-Triol-3,20-Dione*

(a) *21-acetoxy-16β-methyl-5-pregnene-3β,17α-diol-20-one.*—A solution of 16.3 g. of bromine (0.102 mole) in 50 ml. of chloroform was added dropwise over a 30 minute period to 17.33 g. (0.05 mole) of 16β-methyl-5-pregnene-3β,17α-dihydroxy-20-one in 1900 ml. of chloroform with stirring at 25–30° C. A small amount of hydrogen bromide gas was introduced at the start of the bromine addition to catalyse the bromination. Stirring was continued for an additional 10 minutes when decolorization was complete. The solution was neutralized with 50 g. of solid sodium bicarbonate and filtered. The chloroform solution of the 5,6,21-tribromo compound was concentrated to 1400 ml. under reduced pressure below 40° C. Methanol (125 ml.) and 37.5 g. of sodium iodide were added and the mixture was stirred for one hour at 43 to 48° C. The reaction mixture was cooled to 10° C. by the addition of 375 ml. of ice water and 125 g. sodium bicarbonate was added. With good mechanical agitation 8.5% hydrazine hydrate solution was added dropwise until the iodine color was discharged. The hydrazine hydrate required (14 ml.) calculated to be 95% of the theoretical amount for 0.05 mole of iodine. The chloroform layer was separated from the aqueous phase and concentrated to almost dryness under reduced pressure below 40° C. The crude 21-iodo compound was then stirred 17 hours at refluxing temperatures with 125 ml. of acetone, 10 ml. of water and 10 g. of potassium acetate. The acetone was removed by steam distillation and the resulting crystalline product filtered. The wet filter cake was dissolved in methylene chloride, the water separated from the organic phase and the product crystallized from a methylene chloride-hexane mixture. The yield of compound, 21-acetoxy-16β-methyl-5-pregnene-3β,17α-diol-20-one, was 16.0 g. (79.2%), M.P. 170° C. (Kofler hot bench). After recrystallization from acetic acid and acetone-water, the pure compound melted at 175°–176° C.

(b) *16β-methyl-17α-hydroxy-21-acetoxy-4-pregnene-3,20-dione.*—Seven grams of 16β-methyl-5-pregnene-3β,17α-diol-21-acetoxy-20-one was dissolved in 650 ml. of acetone, cooled to 10° C. and reacted with 5 ml. of an aqueous solution of 1.33 g. chromium trioxide and 1.15 ml. of concentrated sulfuric acid. The chromium trioxide solution was added dropwise and the reaction blanketed with nitrogen. The reaction was stirred for an additional five minutes and then poured into 3.0 l. of ice water. After stirring for 10 minutes, the precipitate is filtered, washed neutral with water and dried at 60° C. to give a yield of 6.0 grams, M.P. below 100° C. of 3-keto-Δ⁵ compound. This steroid is dissolved in tetrahydrofuran (50 ml.) and treated with 5 ml. of 6 N hydrochloric acid for two hours. The solvent is removed under reduced pressure and the residue crystallized from acetone-hexane to give the 16β-methyl-17α-hydroxy-21-acetoxy-4-pregnene-3,20-dione.

(c) *16β-methyl-4-pregnene-11α,17α,21-triol-3,20-dione and 16β-methyl-4-pregnene-11β,17α,21-triol-3,20-dione.*—Agar slants containing medium No. 1 described above and 1.5% agar are sterilized for 15 minutes at 121° C. at a pressure of 15 p.s.i. The agar slant is then cooled to about 28° C, slanted and inoculated with a vegetative growth of a culture Phoma (ATCC 13145), and incubated at a temperature of 28° C. for 5–7 days.

A two liter Erlenmeyer flask containing 500 ml. of a similarly sterilized and cooled broth of medium No. 1 is then inoculated with spores and vegetative growth suspension from one of the agar slants and incubated from 24 hours to 36 hours at 28° C. on a New Brunswick rotary shaker set at 280 r.p.m. At the end of this period 500 mg. of 16β-methyl-4-pregnene-17α,21-diol-3,20-dione in 5 ml. of ethanol is added. The flask is replaced on the rotary shaker and incubation continued for a period of from 24 hours to 30 hours during which latter period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with water together with acetone as a dispersant. Incubation is continued until paper chromatography indicates transformation of 16β-methyl-4-pregnene-17α,21-diol-3,20-dione and completion of the reaction. The broth mixture in the Erlenmeyer flask is then extracted with chloroform to effect the isolation of the hydroxylated steroid from the broth mixture. The chloroform is then evaporated off in vacuo to yield a crude steroid extract. 16β-methyl-4-pregnene-11α,17α,21-triol-3,20-dione and 16β-methyl-4-pregnene-11β,17α,21-triol-3,20-dione are recovered from this extract by column chromatography and crystallization as described in Example 1.

What is claimed is:

1. A process which comprises subjecting an 11-desoxy steroid to the oxygenating activity of the microorganism, Phoma (ATCC 13145), to cause the formation of the corresponding 11-hydroxylated derivatives thereof.

2. A process which comprises subjecting an 11-desoxy steroid selected from the group consisting of a 3-ketopregnane, a 3-keto-allopregnane, and an unsaturated analogue thereof to the oxygenating fermentative action of the microorganism, Phoma (ATCC 13145), to produce the corresponding 11-hydroxylated steroid derivatives thereof.

3. A process which comprises subjecting an 11-desoxy steroid selected from the group consisting of a 3-ketopregnane, a 3-keto-allopregnane and an unsaturated analogue thereof to the oxygenating fermentative action of the microorganism, Phoma (ATCC 13145), to produce the corresponding 11α-hydroxylated and 11β-hydroxylated derivatives thereof, and isolating each of said 11α-hydroxylated and 11β-hydroxylated derivatives therefrom.

4. The process of claim 1 wherein the 11-desoxy steroid is subjected to oxygenation under aerobic conditions.

5. A process which comprises subjecting a member selected from the group consisting of 4-pregnene-17α,21-diol 3,20-dione and a C–21 acylate thereof to the oxygenating fermentative action of the microorganism, Phoma (ATCC 13145), to cause the formation of the corresponding 11α-hydroxylated and 11β-hydroxylated derivatives thereof.

6. A process which comprises subjecting a member selected from the group consisting of 4-pregnene-17α,21-diol-3,20-dione and a C–21 acylate thereof to the oxygenating fermentative action of the microorganism, Phoma (ATCC 13145), to cause the formation of the corresponding 11α-hydroxylated and 11β-hydroxylated derivatives, and separating each of said 11α-hydroxylated and 11β-hydroxylated derivatives therefrom.

7. A process which comprises subjecting 4-pregnene-17α,21-diol-3,20-dione to the oxygenating fermentative action of the microorganism, Phoma (ATCC 13145), to cause the formation of the corresponding 11-hydroxylated derivatives thereof.

8. A process which comprises subjecting 4-pregnene-17α,21-diol-3,20-dione to the oxygenating fermentative action of the microorganism, Phoma (ATCC 13145), to cause the formation of the corresponding 11-hydroxylated derivatives thereof and separating each of said 11α-hydroxylated and 11β-hydroxylated derivatives therefrom.

9. A process which comprises subjecting the 21-acetate of 4-pregnene-17α,21-diol-3,20-dione to the oxygenating fermentative action of the microorganism Phoma (ATCC 13145), to cause the formation of the corresponding 11α-hydroxylated and 11β-hydroxylated derivatives thereof.

10. A process which comprises subjecting the 21-acetate of 4-pregnene-17α,21-diol-3,20-dione to the oxygenating fermentative action of the microorganism Phoma (ATCC 13145), to cause the formation of the corresponding 11α-hydroxylated and 11β-hydroxylated derivatives, and separating each of said 11α-hydroxylated and 11β-hydroxylated derivatives therefrom.

11. A process which comprises subjecting a member selected from the group consisting of 1,4-pregnadiene-17α,21-diol-3,20-dione and a C–21 acylate thereof to the oxygenating fermentative action of the microorganism, Phoma (ATCC 13145), to cause the formation of the corresponding 11α-hydroxylated and 11β-hydroxylated derivatives thereof.

12. A process which comprises subjecting a member selected from the group consisting of 1,4-pregnadiene-17α,21-diol-3,20-dione and a C–21 acylate thereof to the oxygenating fermentative action of the microorganism, Phoma (ATCC 13145), to cause the formation of the corresponding 11α-hydroxylated and 11β-hydroxylated derivatives, and separating each of said 11α-hydroxylated and 11β-hydroxylated derivatives therefrom.

13. A process which comprises subjecting 1,4-pregnadiene-17α,21-diol-3,20-dione to the oxygenating fermentative action of the microorganism Phoma (ATCC 13145), to cause the formation of 1,4-pregnadiene-11α,17α,21-triol-3,20-dione and 1,4-pregnadiene-11β,17α,21-triol-3,20-dione.

14. A process which comprises subjecting the C–21 acetate of 1,4-pregnadiene-17α,21-diol-3,20-dione to the oxygenating fermentative action of the microorganism Phoma (ATCC 13145), to cause the formation of 1,4-pregnadiene-11α,17α,21-triol-3,20-dione 21-acetate and 1,4-pregnadiene-11β,17α,21-triol-3,20-dione 21-acetate.

15. A process which comprises subjecting a member selected from the group consisting of 16α-alkylallopregnane-17α,21-diol-3,20-dione and C–21 acylate thereof to the oxygenating fermentative action of the microorganism, Phoma (ATCC 13145), to cause the formation of the corresponding 11α-hydroxylated and 11β-hydroxylated derivatives thereof.

16. A process which comprises subjecting a member selected from the group consisting of 16α-alkylallopregnane-17α,21-diol-3,20-dione and C–21 acylate thereof to the oxygenating fermentative action of the microorganism, Phoma (ATCC 13145), to cause the formation of the corresponding 11α-hydroxylated and 11β-hydroxylated derivatives, and separating each of said 11α-hydroxylated and 11β-hydroxylated derivatives therefrom.

17. A process which comprises subjecting 16α-methylallopregnane-17α,21-diol-3,20-dione to the oxygenating fermentative action of the microorganism Phoma (ATCC 13145), to cause the formation of the corresponding 11-hydroxylated derivatives thereof.

18. A process which comprises subjecting the C–21 acetate of 16α-methylallopregnane-17α,21-diol-3,20-dione to the oxygenating fermentative action of the microorganism Phoma (ATCC 13145), to cause the formation of the corresponding 11-hydroxylated derivatives thereof.

19. A process which comprises subjecting a member selected from the group consisting of 16β-alkylallopregnane-17α,21-diol-3,20-dione and a C–21-acylate thereof to the oxygenating fermentative action of the microorganism, Phoma (ATCC 13145), to cause the formation of the corresponding 11α-hydroxylated and 11β-hydroxylated derivatives thereof.

20. A process which comprises subjecting a member selected from the group consisting of 16β-alkylallopregnane-17α,21-diol-3,20-dione and a C–21-acylate thereof to the oxygenating fermentative action of the microorganism, Phoma (ATCC 13145), to cause the formation of the corresponding 11α-hydroxylated and 11β-hydroxylated derivatives, and separating each of said 11α-hydroxylated and 11β-hydroxylated derivatives therefrom.

21. A process which comprises subjecting 16β-methylallopregnane-17α,21-diol-3,20-dione to the oxygenating fermentative action of the microorganism Phoma (ATCC 13145), to cause the formation of 16β-methylallopregnane-11α,17α,21-triol-3,20-dione and 16β-methylallopregnane-11β,17α,21-triol-3,20-dione.

22. The process which comprises subjecting the C–21 acetate of 16β-methylallopregnane-17α,21-diol-3,20-dione to the oxygenating fermentative action of the microorganism Phoma (ATCC 13145) to cause the formation of 16β-methylallopregnane-11α,17α,21-triol-3,20-dione 21-acetate and 16β-methylallopregnane-11β,17α,21-dione 21-acetate.

23. A process which comprises subjecting 16α-tert.-butylallopregnane-17α,21-diol-3,20-dione to the oxygenating fermentative action of the microorganism Phoma (ATCC 13145) to cause the formation of 16α-tert.-butylallopregnane-11α,17α,21-triol-3,20-dione and 16α-tert.-butylallopregnane-11β,17α,21-triol-3,20-dione.

24. A process which comprises subjecting 16β-ethylallopregnane-17α,21-diol-3,20-dione to the oxygenating fermentative action of the microorganism Phoma (ATCC 13145) to cause the formation of 16β-ethylallopregnane-11α,17α,21-triol-3,20-dione and 16β-ethylallopregnane-11β,17α,21-triol-3,20-dione.

25. A process which comprises subjecting a member selected from the group consisting of a 16α-alkyl-1,4-pregnadiene-17α,21-diol-3,20-dione, and a C–21-acylate thereof to the oxygenating fermentative action of the microorganism, Phoma (ATCC 13145), to cause the formation of the corresponding 11α-hydroxylated and 11β-hydroxylated derivatives thereof.

26. A process which comprises subjecting a member selected from the group consisting of a 16α-alkyl-1,4, pregnadiene-17α,21-diol-3,20-dione, and a C–21-acylate thereof to the oxygenating fermentative action of the microorganism, Phoma (ATCC 13145), to cause the formation of the corresponding 11α-hydroxylated and 11β-hydroxylated derivatives, and separating each of said 11α-hydroxylated and 11β-hydroxylated derivatives therefrom.

27. A process which comprises subjecting 16α-methyl-1,4-pregnadiene-17α,21-diol-3,20-dione to the oxygenating fermentative action of the microorganism Phoma (ATCC 13145) to cause the formation of 16α-methyl-1,4-pregnadiene-11α,17α,21-triol-3,20-dione and 16α-methyl-1,4-pregnadiene-11β,17α,21-triol-3,20-dione.

28. A process which comprises subjecting the C–21 acetate of 16α-methyl-1,4-pregnadiene-17α,21-diol-3,20-dione to the oxygenating fermentative action of the microorganism Phoma (ATCC 13145) to cause the formation of 16α-methyl-1,4-pregnadiene - 11α,17α,21 - triol - 3,20- dione 21-acetate and 16α-methyl-1,4-pregnadiene-11β,17α,21-triol,3,20-dione 21-acetate.

29. A process which comprises subjecting a member selected from the group consisting of a 16β-alkyl-1,4-pregnadiene-17α,21-diol-3,20-dione and a C–21-acylate thereof to the oxygenating fermentative action of the microorganism, Phoma (ATCC 13145), to cause the formation of the corresponding 11α-hydroxylated and 11β-hydroxylated derivatives thereof.

30. A process which comprises subjecting a member selected from the group consisting of a 16β-alkyl-1,4-pregnadiene-17α,21-diol-3,20-dione and a C–21 acylate thereof to the oxygenating fermentative action of the microorganism, Phoma (ATCC 13145), to cause the formation of the corresponding 11α-hydroxylated and 11β-hydroxylated derivatives, and separating each of said 11α-hydroxylated and 11β-hydroxylated derivatives therefrom.

31. A process which comprises subjecting 16β-methyl-1,4-pregnadiene-17α,21-diol-3,20-dione to the oxygenating fermentative action of Phoma (ATCC 13145) to cause the formation of 16β-methyl-1,4-pregnadiene-11α,17α,21-triol-3,20-dione and 16β-methyl-1,4-pregnadiene-11β,17α,21-triol-3,20-dione.

32. A process which comprises subjecting the C–21 acetate of 16β-methyl-1,4-pregnadiene-17α,21-diol-3,20-dione to the oxygenating fermentative action of Phoma (ATCC 13145) to cause the formation of 16β-methyl-1,4-pregnadiene,11α,17α,21-triol-3,20-dione 21-acetate and 16β-methyl - 1,4 - pregnadiene-11β,17α,21-triol-3,20-dione 21-acetate.

33. A process which comprises subjecting 16α-tert.-butylallopregnane-1,4-pregnadiene-17α,21-diol-3,20-dione to the oxygenating fermentative action of Phoma (ATCC 13145) to cause the formation of 16α-tert.-butylallopregnane-1,4-pregnadiene - 11α,17α,21-triol - 3,20 - dione and 16α-tert.-butylallopregnane-1,4-pregnadiene - 11β,17α,21-triol-3,20-dione.

34. A process which comprises subjecting 16β-ethyl-1,4-pregnadiene-17α,21-diol-3,20-dione to the oxygenating fermentative action of Phoma (ATCC 13145) to cause the formation of 16β-ethyl-1,4-pregnadiene-11α,17α,21-triol-3,20-dione and 16β-ethyl-1,4-pregnadiene-11β,17α,21-triol-3,20-dione.

35. A process which comprises subjecting a member selected from the group consisting of a 16-alkyl-4-pregnene-17α,21-diol-3,20-dione and a 21-acylate thereof to the oxygenating fermentative action of the microorganism, Phoma (ATCC 13145), to cause the formation of the corresponding 11α-hydroxylated and 11β-hydroxylated derivatives thereof.

36. A process which comprises subjecting a member selected from the group consisting of a 16-alkyl-4-pregnene-17α,21-diol-3,20-dione and a 21-acylate thereof to the oxygenating fermentative action of the microorganism, Phoma (ATCC 13145), to cause the formation of the corresponding 11α-hydroxylated and 11β-hydroxylated derivatives, and separating each of said 11α-hydroxylated and 11β-hydroxylated derivatives therefrom.

37. A process which comprises subjecting 16α-methyl-4-pregnene-17α,21-diol-3,20-dione to the oxygenating fermentative action of Phoma (ATTCC 13145) to cause the formation of 16α-methyl-4-pregnene-11α,17α,21-triol-3,20-dione and 16α-methyl-4-pregnene-11β,17α,21-triol-3,20-dione.

38. A process which comprises subjecting the C–21-acetate of 16α-methyl-4-pregnene-17α,21-diol-3,20-dione to the oxygenating fermentative action of Phoma (ATCC 13145) to cause the formation of 16α-methyl-4-pregnene-11α,17α,21-triol-3,20-dione 21-acetate and 16α-methyl-4-pregnene-11β,17α,21-triol-3,20-dione 21-acetate.

39. The process which comprises the steps of subjecting an 11-desoxy steroid selected from the group consisting of a pregnane, allopregnane, and an unsaturated analogue thereof, to the enzymatic action of the microorganism, Phoma (ATCC 13145), to cause the formation of the 11-hydroxylated derivatives of said steroid and recovering said hydroxylated derivative therefrom.

40. A process which comprises the steps of subjecting an 11-desoxy steroid selected from the group consisting of a pregnane, allopregnane, and an unsaturated analogue thereof, to the enzymatic action of the microorganism, Phoma (ATCC 13145), to cause the formation of the 11α-hydroxylated and 11β-hydroxylated derivatives of said steroid and separating each of said 11α-hydroxylated and 11β-hydroxylated derivatives therefrom.

References Cited in the file of this patent

UNITED STATES PATENTS

| 2,793,163 | Thoma | May 21, 1957 |
| 2,819,200 | Dulaney | Jan. 17, 1958 |
| 2,844,513 | Wettstein | July 22, 1958 |

OTHER REFERENCES

Thom: Ann. New York Acad., Sci., 60, 1 page, 27.

Clements et al.: Genera of Fungi, 1931 (2d printing 1954) pages 13–15.

Bisby: An Introduction to the Taxonomy and Nomenclature of Fungi, 2d edition, 1953, The Commonwealth Mycological Institute, Kew, Surrey, pages 3, 4, 29 to 33, 75 and 117.

Ainsworth and Cowan: Rules of Nomenclature for Fungi and Bacteria, Jour. Gen. Microbiology, 10, 1954, pages 465–474.